US012792513B2

(12) United States Patent
Goel

(10) Patent No.: US 12,792,513 B2
(45) Date of Patent: Nov. 10, 2026

(54) ACCELERATOR HAVING PORT TO VIRTUAL MEMORY ADDRESS ASSOCIATION LOGIC

(71) Applicant: Arm Limited, Cambridge (GB)

(72) Inventor: Deepak Goel, San Jose, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/022,684

(22) Filed: Jan. 15, 2025

(65) Prior Publication Data

US 2026/0203218 A1 Jul. 16, 2026

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01); *G06F 2212/65* (2013.01)

(58) Field of Classification Search
CPC ............... G06F 3/0635; G06F 12/0802; G06F 2212/60; G06F 2212/65
See application file for complete search history.

(56) References Cited

U.S. PATENT DOCUMENTS

2012/0072677 A1* 3/2012 Biswas .................. G06F 13/18 711/149
2014/0208075 A1* 7/2014 McCormick, Jr. .. G06F 12/1027 712/207
2016/0036623 A1* 2/2016 Clarkson ............ G06F 11/2069 714/4.11
2021/0208924 A1* 7/2021 Krueger ............... G06F 3/0679

* cited by examiner

*Primary Examiner* — Khoa D Doan
(74) *Attorney, Agent, or Firm* — Berkeley Law & Technology Group, LLP

(57) ABSTRACT

Briefly, example apparatuses, articles of manufacture, and/or techniques are disclosed that may be implemented, in whole or in part, to implement, facilitate and/or support integrated circuitry comprising a cache to associate a plurality of ports to virtual memory addresses, cache control circuitry to update the cache to associate the first port with the virtual memory address responsive to a transaction latency meeting a threshold latency condition.

20 Claims, 6 Drawing Sheets

ACCELERATOR HAVING PORT TO VIRTUAL MEMORY ADDRESS ASSOCIATION LOGIC

FIELD

The present disclosure relates generally to integrated circuitry, and more particularly, accelerator devices.

BACKGROUND

A hardware accelerator ("accelerator") may comprise hardware designed to perform specific functions that may otherwise be performed by a general-purpose central processing unit (CPU). For example, an accelerator may comprise a graphics processing unit (GPU), an artificial intelligence (AI) accelerator, machine learning accelerators, neural processing unit, visual processing unit, digital signal processor, data/information processing units (e.g., "smart-NICs"), encryption accelerators, mathematical accelerators such as dot-product accelerators, or any other workload accelerators. Accelerators may include programmable devices, fixed-function devices, reconfigurable devices, and/or the like. Different accelerators may be based on a variety of hardware architectures, such as programmable processing circuitry, field-programmable gate arrays (FPGA), application-specific integrated circuits (ASICs), and/or the like.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
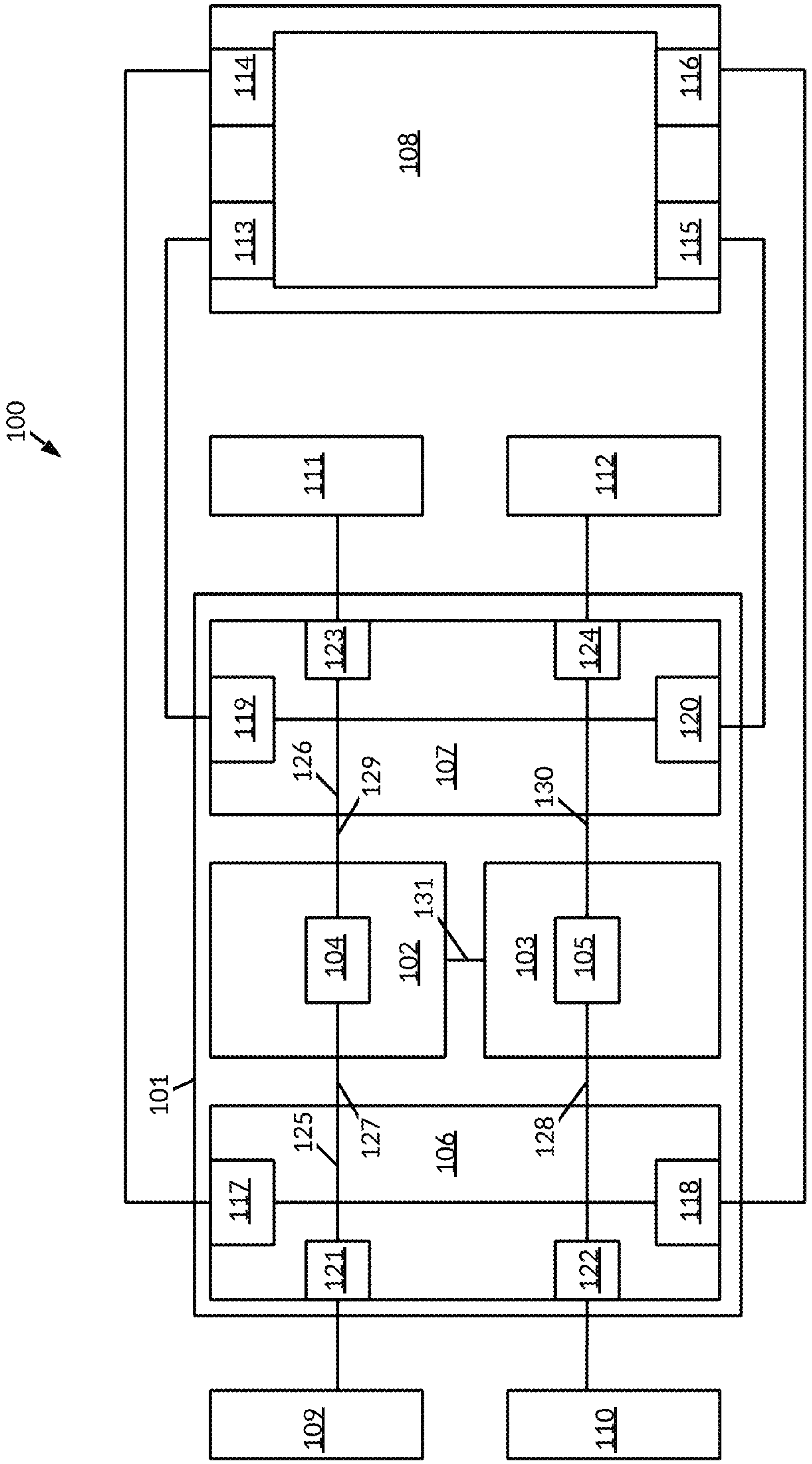
FIG. 1 illustrates an example system comprising a memory bridge device and an accelerator, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular example, implementation and/or embodiment is included in at least one example, implementation and/or embodiment of claimed subject matter. Thus, appearances of such phrases, for example, in various places throughout this specification are not necessarily intended to refer to the same implementation and/or embodiment and/or to any one particular implementation and/or embodiment. Furthermore, it is to be understood that particular features, structures, characteristics, and/or the like described are capable of being combined in various ways in one or more implementations and/or embodiments and, therefore, are within intended claim scope. Unless explicitly indicated to the contrary, reference to "another example" and/or "a further example" does not indicate that the described example is an exclusive alternative to a preceding example. In general, such examples may be alternatives to and/or additions to previous examples.

As used herein, terms referencing cardinal directions (e.g., "north," "east," "south," and "west") may be used to describe aspects of illustrated components. These terms should be understood as explanatory device to refer to the on-page orientation of the described figure and not any particular physical orientation.

As used herein, the term "cacheline" may refer to a contiguous unit of data associated with the transfer of data to and/or from a computer memory system, such as, for example, a unit of data that is referenced in a memory load/store transaction. In some cases, cachelines may correspond to the basic units of data that are stored in a line of a CPU or other data cache. Additionally, in a cache-coherent system cachelines may correspond to the units of data that are subject to cache-coherency communications, such as a MESI (modified, exclusive, shared, invalid) protocol. However, in other cases, cachelines may refer generally to a unit of data associated with a transaction in a memory-semantic communication protocol, regardless of whether that unit of data is cached or whether that unit of data is maintained in a cache coherent manner. As an example, a typical cacheline may comprise 16-256 bytes of data, including, for example, 64 bytes. A cacheline may be associated with a memory address, which may, for example, refer to the address of the first byte of the cacheline. Accordingly, a particular cacheline may be associated with multiple memory address types, which may, for example, be based, at least in part, on a memory address space. For instance, a cacheline may be associated with one or more virtual memory addresses, system physical memory addresses, device physical addresses, As used herein, the term "chiplet" may refer to one of a plurality of integrated circuits disposed within a common package (a "chiplet package"). Chiplets may implement any type of circuitry, such as processing cores, arithmetic processing units, graphics processing units, application specific ICs (ASICs) such as accelerator cores, analog processing circuitry, analog-to-digital/digital-to-analog converters, networking circuitry, memory circuitry, and/or the like. As a simple example, a chiplet-based processor might comprise a number of chiplets that each implement a plurality of processing cores, a chiplet to implement a memory management unit, and a chiplet-to-chiplet interconnect to provide the processing chiplets access to the memory chiplet. A chiplet may comprise circuitry to execute operational code, such as boot code as described below. In some cases, separate chiplets may be disposed on separate semiconductor dies. Chiplets may be connected in a network within their package via chiplet-to-chiplet interconnects. For example, a chiplet network may operate with relatively lower voltages/power compared to board-level interconnects/networks. In some cases, such a chiplet-to-chiplet interconnect may be contained entirely within the chiplet package (e.g., lacking package contacts). Packages may expose and/or otherwise provide contacts for power and/or package-external signaling. Chiplets may have unique identities and/or operational roles within their package. For example, chiplets may have separate identifiers used for chiplet-to-chiplet communications. In some cases, a package of chiplets may appear as a single device with respect to devices external to the package. In other cases, a chiplet package may appear as separate devices corresponding to groups of one or more chiplets.

Memory semantic protocols may provide communication formats where transactions are associated with memory addresses. For example, memory semantic protocols may support a wide variety of system functions, including access to system memory, inter-device communications via memory-mapped input/output (I/O), system or function calls via memory-addressed command registers, compute-in-memory functions such as atomic operations, cache coherency communications, and/or the like. In some implementations, one or more host devices, a fabric manager, and/or the like, may manage a memory address space that is exposed via a memory-semantic interconnect to associate memory locations with physical memory addresses. Software programs, accelerator logic, and/or other execution units may have virtual memory addresses that abstract the physical address space and provide a process with a continuous address space. In some implementations, virtual-to-physical memory address translation may be performed to locate a physical location of a virtual memory address. For example, an MMU of a host device may conduct virtual-to-physical memory address translation with respect to the memory that it manages.

In some implementations, an accelerator may have multiple links to a memory fabric, where certain links are closer to certain physical memory regions than other physical memory regions. For example, in a switched memory fabric, different accelerator links may be different numbers of network hops away from different memory locations. In some cases, a host device may use a hashing function to translate virtual addresses to physical addresses and an accelerator may have a programmable hash function that can be programmed to match the host device. Accordingly, in such examples, the accelerator may use the physical address to select a link on which to issue a transaction and take advantage of locality to reduce memory access latency. However, such solutions may require significant accelerator circuitry area to accommodate address translation functionality. Additionally, such approaches may require an accelerator to be designed according to a specific host architecture and may create interoperability issues and/or incompatibilities if the accelerator is to be deployed with a different host type.

Aspects of the disclosed technology may address challenges such as these by providing an apparatus having circuitry to associate virtual memory addresses to available ports based, at least in part, on a latency of a transaction. For example, an apparatus may include a memory-semantic interface comprising a plurality of ports, and port select circuitry to select a port to transmit a first transaction request associated with a virtual memory address. In some examples, the apparatus may include request circuitry to issue the first transaction request via the first port and tracking circuitry to measure a latency of a response to the transaction request. The apparatus may further include a cache to associate the plurality of ports to virtual memory addresses, and cache control circuitry to update the cache to associate the first port with the virtual memory address responsive to the latency meeting a threshold latency condition.

FIG. 1 illustrates an example system comprising a memory bridge device 101 and an accelerator 108, in accordance with an implementation. Generally, FIG. 1 illustrates an example system 100 having multiple paths between accelerator 108 and a memory system 109-112 to illustrate various aspects of the disclosed technology. In further implementations, an accelerator 108 may be deployed in any system comprising any fabric architectures, such as a multi-level switched topology, and/or the like.

As an example, device 101 may comprise a package comprising one or more chiplets ("advanced package"), such as, for example, a multi-chip module, a stacked IC package ("3D IC"), chiplets coupled to a interposer ("2.5D IC"), wafer-level fan-out package, quilted chiplet package, and/or other packaged IC. In various implementations, device 101 may comprise any multi-chip device, such as, for example, an accelerator, micro controller, central processing unit (CPU), graphics processing unit (GPU), memory module, storage device, and/or other computing system component.

In some implementations, accelerator 108 may comprise any workload accelerator, such as, for example, a graphics processing unit (GPU), an artificial intelligence (AI) accelerator, machine learning accelerator, neural processing unit, visual processing unit, digital signal processor, data/information processing unit, encryption accelerator, mathematical accelerator such as dot-product, multiply-accumulate, and/or convolution accelerators, or any other workload accelerators. For instance, accelerator 108 may comprise an FPGA, ASIC, programmable execution unit, combinations thereof, and/or the like.

In some implementations, a memory bridge 101 may comprise a plurality of chiplets 102, 103, 106, 107. For example, memory bridge 101 may comprise central chiplets 102, 103 comprising MMUs 104, 105. In some implementations, memory management units (MMUs) 104, 105 may comprise circuitry to manage a system memory address space, conduct memory transactions, such as issuing read and write transactions, performing virtual-to-physical address translation, and/or the like. For example, central chiplets 102, 103 may comprise host devices connected to one or more memory devices 109-112 providing a pool of memory having a memory address space comprising a physical address space. In some implementations, a physical address space may be divided between central chiplets 102, 103 as host devices. For example, in the illustrated implementation, central chiplet 102, 103 may each host half of the memory address space. Of course, this is merely an example and implementations may distribute a physical address space in any manner.

In some implementations, memory bridge 101 may comprise a chiplet-to-chiplet interconnect 131, such as, for example, a UCIe, UCIe-advanced (UCIe-a), Bunch of Wires (BoW), and/or like interconnect. In some implementations, interconnect 131 may carry north-south communications between central chiplets 102, 103. For example, interconnect 131 may facilitate cooperative workload execution. As another example, interconnect 131 may support communications between MMUs 105, 105, such as, for example, virtual address translation for each other's portion of the memory address space, cache-coherency-related communications, and/or the like.

In some implementations, memory bridge 101 may comprise a plurality of wing chiplets 106, 107 located at either side of central chiplets 102, 103. In some cases, wing chiplets 106, 107 may be connected to each of central chiplets 102, 103 via chiplet-to-chiplet interconnects 127, 128, 129, 130, such as, for example, a UCIe, UCIe-advanced (UCIe-a), Bunch of Wires (BoW), and/or like interconnect.

In some implementations, wing chiplets 106, 107 may comprise interface circuitry 121, 122, 123, 124 for one or more memory interconnects. For example, interface circuitry 106, 117 may comprise one or more memory fabric edge ports connecting DDR memory channels to the memory fabric. As an example, interfaces 121 and 123 may be managed by chiplet 102 as a host device and interfaces 122 and 124 may be managed by chiplet 103 as a host device. For instance, device 101 may provide a cache-coherent bridge to a memory system 109-112.

In some implementations, wing chiplets 106, 107 may comprise interface circuitry 117, 118, 119, 120 for one or more package-external communication interconnects, such as Advanced Microcontroller Bus Architecture (AMBA) interconnects (including, e.g., AXI, APB), CXL interconnects, Infiniband interconnects, PCIe interconnects, and/or the like. As a particular example, interfaces 107, 112, 118, 119 may comprise one or more edge ports for a memory-semantic interconnect that supports peer-to-peer (P2P) memory access, such as for example, CXL.mem and/or CXL.cache.

In some implementations, wing chiplets 106, 107 may comprise on-chiplet networks 125, 126 interconnecting package-external interfaces 117, 118, 119, 120, and package-external memory interfaces 121, 122, 123, 124. In some implementations, networks 125, 126 may be interconnected via central chiplets 102, 103 and communications (e.g., memory read/write requests and responses, compute-in-memory operational requests etc. . . . ) from each interface 117, 118, 119, 120 may be transported to and from any memory interface 121, 122, 123, 124. For example, memory transactions communications may be routed by wing chiplets 106, 107 between package-external interfaces 117, 118, 119, 120 and package-external memory interfaces 121, 122, 123, 124 in a peer-to-peer manner independently of MMUs 104, 105. As an example, FIG. 4 illustrates traffic across example implementations of networks 125, 126.

In some implementations, system 100 may further include an accelerator 108. For example, accelerator 108 may comprise an ASIC, FPGA, processor, or other circuitry to perform various workloads, such as an artificial intelligence (AI) accelerator, neural processing unit, visual processing unit, digital signal processor, or any other workload acceleration circuitry. Accelerator 108 may conduct memory transactions, (e.g., reads, writes, atomic compute-in-memory operations, and/or the like) on memory 109, 110, 111, 112 via memory bridge 101. For example, accelerator 108 may comprise a plurality of memory-semantic interconnect interfaces 113, 114, 115, 116 connected to interfaces 117, 119, 118, 120, respectively. For example, interfaces 113, 114, 115, 116 may comprise a plurality of ports connected to corresponding ports of interfaces 117, 119, 118, 120.

In some implementations, accelerator 108 may operate on data based on virtual memory addresses and may issue transactions related to the virtual memory addresses via a selected port of interfaces 113, 114, 115, 116. A latency of a transaction may depend, at least in part, on which interface the transaction was issued. For example, accelerator 108 may issue a transaction request for a virtual memory address x via interface 116 that corresponds to a physical memory address y of memory 111. Here, the transaction request may arrive at interface 118 and be routed by bridge 101 to interface 123. This example request may be routed from interface 118, across wing chiplet 106, one of central chiplets 102, 103, and wing chiplet 107 to interface 120. Similarly, a response may returned over the same number of network hops. Accordingly, this example response/request transaction may incur 8 network hops. Comparatively, had the accelerator 108 issued the same transaction request via interface 113, the request may be routed across wing chiplet 107 to memory 111 via interface 123, and similarly for a response in the opposite order. Accordingly, in this situation, the request/response would incur only 4 network hops. In some implementations, accelerator 108 may include tracking circuitry to measure a latency of a response to the transaction request and to associate a virtual memory address with a particular port based on the latency.

Figure 2:
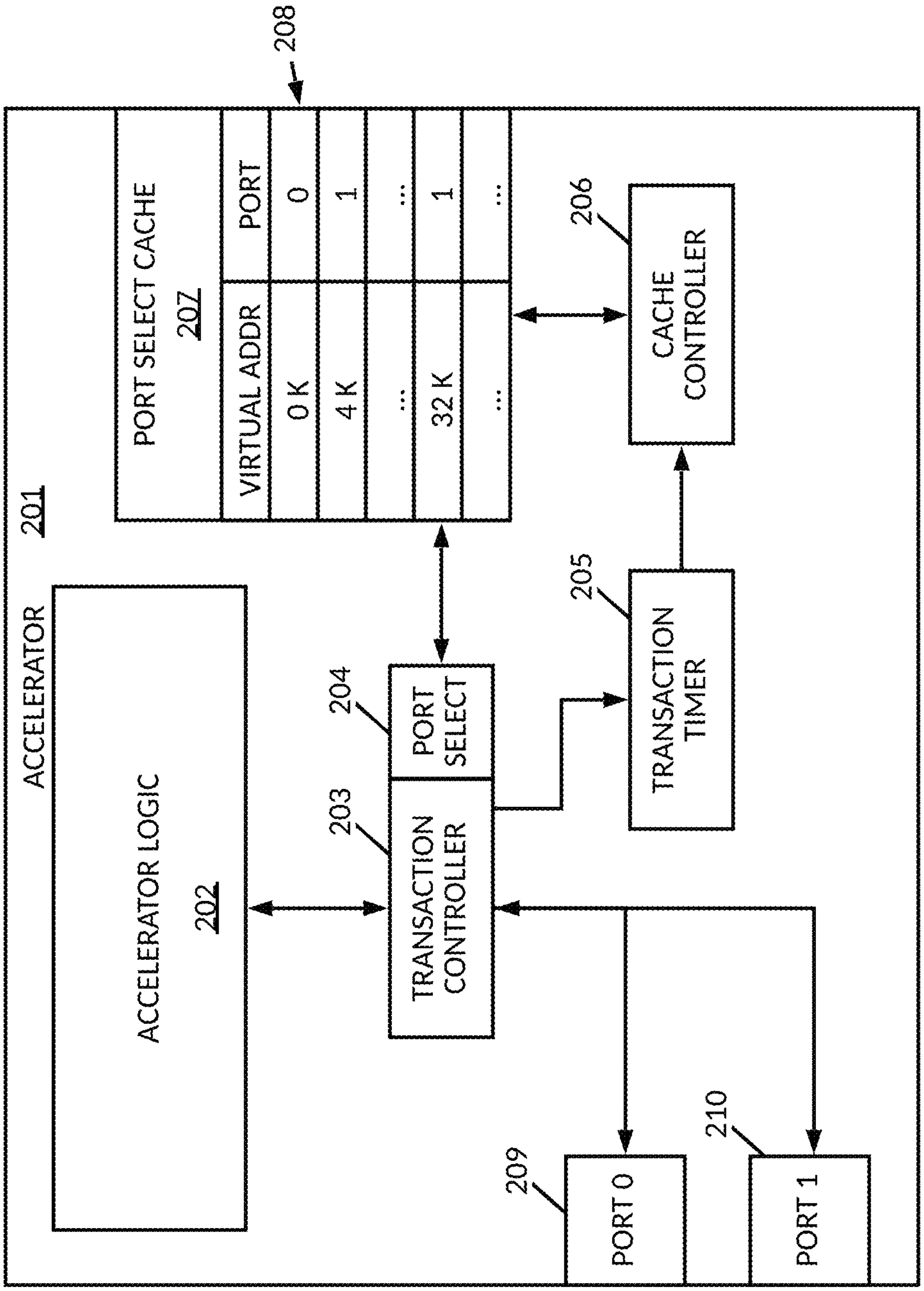
FIG. 2 illustrates an example accelerator apparatus in accordance with an implementation.

FIG. 2 illustrates an example accelerator apparatus 201 in accordance with an implementation. In some implementations, accelerator 201 may comprise a device that performs computational tasks based on instructions received from a host device, such as a CPU. For example, accelerator 201 may be implemented as described with respect to accelerator 108 of FIG. 1, accelerator 301 of FIG. 3, and/or any other accelerator described herein.

In some implementations, accelerator 201 may comprise a plurality of ports 209, 210 which may be connected to a memory bridge device, such as device 101 of FIG. 1. As an example, port 209 may comprise an implementation of interface circuitry 114 of accelerator 108, which may be connected to corresponding interface circuitry 117 of a first wing chiplet 106 of a chiplet-based bridge device 101. Continuing the example, port 210 may comprise an implementation of interface circuitry 114 connected to corresponding interface circuitry 119 of a second chiplet. Accordingly, as described above, port 209 may be closer to a first portion of a physical memory system (e.g., memory 109, 110) than a second portion of a physical memory system (e.g., memory 111, 112). Similarly, port 210 may be closer to the second portion of the physical memory system (e.g., memory 111, 112) than the first portion (e.g., memory 109, 110).

In some implementations, accelerator 201 may comprise accelerator logic circuitry 202. Accelerator logic 202 may comprise various computational circuitry. For example, accelerator logic 202 may include processing circuitry to implement an instruction set architecture (ISA), an ASIC, an FPGA, combinations thereof, and/or the like. In some implementations, accelerator logic 202 may comprise circuitry to execute program code, hardware to implement program logic, application-specific integrated circuitry, a programmed FPGA, and/or the like that operates on data based on virtual memory addresses. For example, accelerator logic 202 may issue memory transaction requests associated with virtual memory addresses, such as memory reads, memory writes, atomic memory operations, and/or the like. For instance, accelerator logic 202 may comprise cache controller (or other memory controller) circuitry to issue a request to load a number of cachelines into registers, local memory, cache and/or the like within logic 202.

In some implementations, accelerator 201 may comprise interface circuitry comprising a plurality of ports 209, 210. For example, each port 209, 210 may comprise a routable endpoint for a memory semantic interconnect, such as a CXL edge port. In some cases, ports 209, 210 may be connected to different locations in a fabric topology or otherwise have different network distances to different regions of a memory system. For example, port 209 might be connected to a first wing chiplet 106 and port 210 might be connected to a second wing chiplet 107 as discussed with respect to FIG. 1. As another example, port 209 might be connected to a first memory expander device and port 210 might be connected to a second memory expander device. As a further example, port 209 might be connected to a first host domain and port 210 might be connected to a second host domain.

In some implementations, accelerator 201 may comprise transaction controller circuitry 203. For example, transaction controller 203 may receive commands from accelerator logic 202, such as a load or store command associated with one or more virtual memory addresses. Transaction controller 203 may comprise port select circuitry 204 to select a port to conduct a transaction based on the virtual memory address(es) associated with a transaction. In various implementations, port select circuitry 204 may comprise circuitry to determine a port based on various factors, including latency of prior transactions to memory addresses in a common block of memory addresses, such as a memory page.

In some implementations, accelerator 201 may comprise a port select cache 207 to store an association between virtual memory addresses and ports. For example, port select cache 207 may comprise entries 208 associating a virtual memory address with a port. For instance, entries 208 may associate a page of virtual memory addresses with a port. As an example, port select cache 207 may comprise a content-addressable memory (CAM) that may be queried based, at least in part, on a number of significant bits of a virtual memory address indicative of a memory address page. For instance, cache entries 208 may be associated with 4 KB, 8 KB, and/or like units of data. As a concrete example, port select cache 207 might have entries corresponding to virtual memory pages that comprise 64 cachelines (e.g., 4096 bytes in a 64 byte cacheline system). In further implementations, entries 208 may be associated with groups of pages, portions of pages, individual cachelines, and/or any other granularity of data.

In some implementations, port select circuitry 204 may perform a cache lookup operation on port select cache 207 based on the virtual memory address of a to-be-issued transaction. As an example, port select circuitry 204 may perform a CAM lookup based on a number of address bits corresponding to cache entries 208. If a cache entry 208 exists for the page containing the virtual memory address, then port select circuitry 204 may retrieve a corresponding port identifier (0 or 1 for the illustrated two-port example). If a cache entry 208 does not exist, port select circuitry 204 may select a port based on various techniques, such as a random selection, a round-robin selection, a load-balancing technique, and/or the like.

In some implementations, accelerator 201 may further comprise transaction timing circuitry 205. In some case, transaction controller 203 may issue a memory transaction via a port 209, 210 selected by port select circuitry 204. In some implementations, selected port circuitry 209, 210 may determine a physical memory address for the transaction. For example, port circuitry 209, 210 may comprise a device translation look aside buffer (TLB) that may be populated according to an address translation service protocol provided by the memory-semantic protocol. In further implementations, virtual-to-physical address translation may take place elsewhere in the memory fabric, such as, for example, at the receiving port connected to the selected port 209, 210.

In some implementations, accelerator 201 may further comprise transaction timer circuitry 205 and cache controller circuitry 206. In some cases, transaction controller 203 may use transaction timer 205 to track the latency of the transaction, such as, for example, a time for a transaction response to arrive via the selected port 209, 210. For example, transaction timer 209 may comprise a data structure such as a table to track outstanding memory transactions. For instance, transaction timer 209 may store a virtual address and a transaction issue time. When a transaction completes, transaction timer 209 may provide a transaction latency to cache controller 206 based on a difference between a completion time and the transaction issue time.

In some implementations, cache controller 206 may evaluate a transaction latency received from transaction timer 201 according to a latency condition. If the transaction latency meets the latency condition, then cache controller 206 may update port select cache 207 by associating the virtual memory address of the transaction with the previously selected port 209, 210. For example, cache controller 206 may add an entry 208 that corresponds to the virtual memory address. For instance, cache controller 206 may add an entry 208 for the virtual memory page containing the virtual memory address. In various implementations, cache controller 206 may perform other cache maintenance operations, such as for example, evictions, invalidation, and/or the like.

In some cases, the latency condition may be indicative of a distance between the selected port 209, 210 and the memory corresponding to the virtual memory address. For instance, the latency condition may be indicative of a number of network hops that the transaction underwent. For example, cache controller 206 may comprise a programmable register to store a threshold latency, which may be programmed during system initialization and/or accelerator manufacture. In some implementations, a protocol may provide a range of potential latencies for memory transactions, such as a memory read latency range. For instance, the threshold latency might be 100 ns for a protocol that provides expected latencies between 80-150 nanoseconds. As another example, cache controller 206 may comprise circuitry to determine a threshold latency or other latency condition. For instance, transaction timer 201 may track an average transaction latency in addition to individual transaction latencies. In this example, a latency threshold may be based, at least in part, on the average transaction latency. For instance, the threshold may be the average transaction latency or may be a percentage of the average latency. As a further example, described below with respect to FIG. 3, entries 208 of port select cache 207 may include latencies of previous transactions (e.g., the latency of the last transaction to corresponding to the entry), which may be used by cache controller 206 as a latency condition.

In some implementations, cache controller 206 may update the cache 207 based on a transaction failing to meet a transaction latency condition. For instance, if a transaction associated with an existing cache entry 208 fails to meet the latency threshold, cache controller 206 may evict and/or otherwise invalidate the existing cache entry. As another example, cache entries 208 may comprise excluded ports associated with virtual memory addresses. Here, if a transaction fails to meet the latency threshold, the cache controller 206 may update the cache to exclude the previously selected port from future port selections. As a further example, based on a latency condition failure, cache controller 206 may update cache 207 to store a port other than the port that was used for the transaction. For example, if a transaction for memory address 4096 was issued on port 0 209 and that transaction failed the latency condition, the cache controller 206 might update a cache entry 208 for page 4K (e.g., the virtual memory page beginning at address 4096) with port 1 210.

In further implementations, cache controller 206 may evaluate the latency according to other latency conditions. For example, the latency condition may have multiple thresholds, such as a low-latency threshold and a high-latency threshold. In this example, cache controller 206 may update port select cache 207 to add the previously-selected port if the transaction meets the low-latency threshold, may evict or exclude the previously-selected port if the transaction exceeds the high-latency threshold, and may leave port select cache 207 unchanged if the transaction latency falls between the low and high thresholds.

Figure 3:
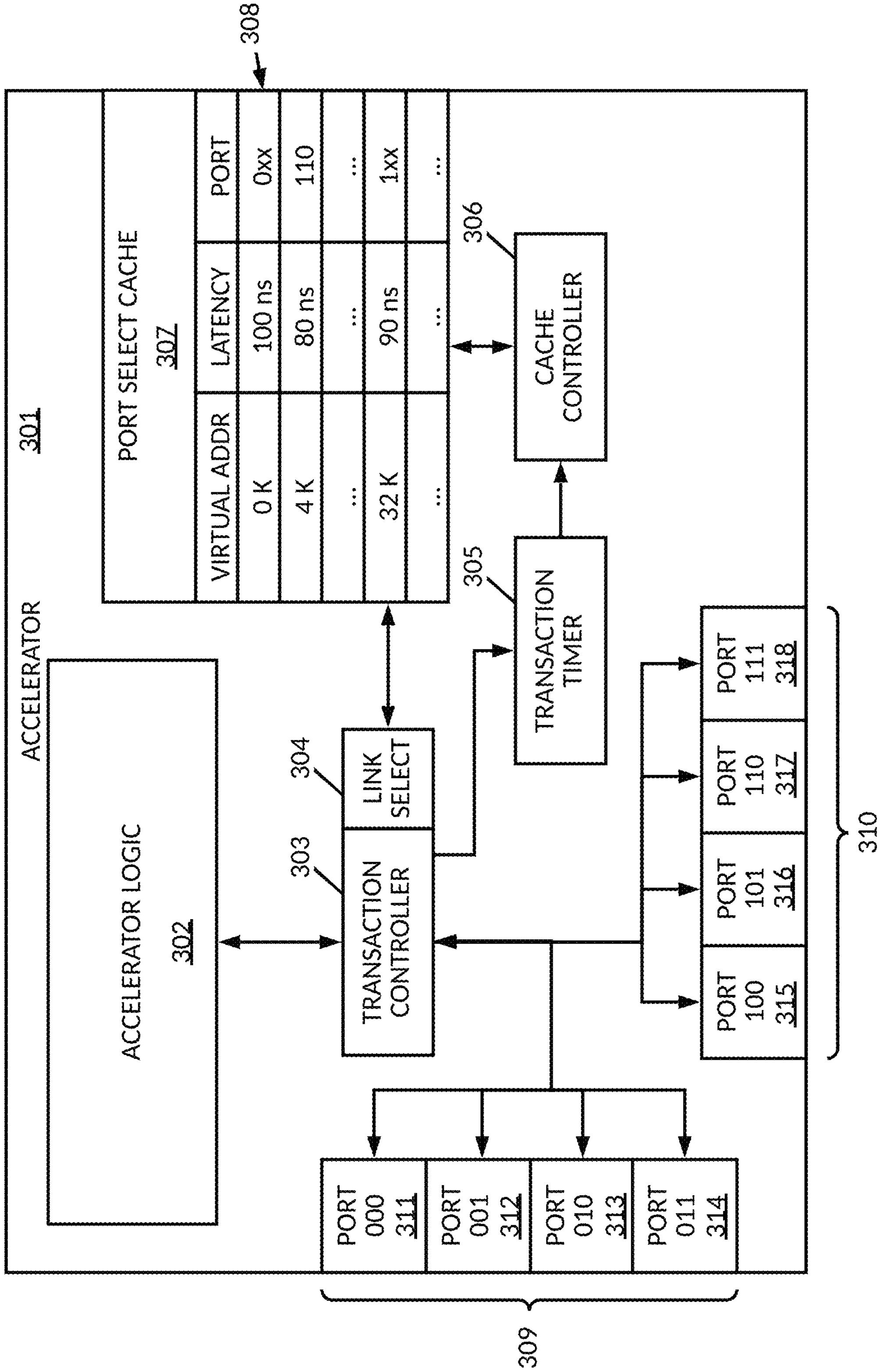
FIG. 3 illustrates another example accelerator apparatus in accordance with an implementation.

FIG. 3 illustrates an example accelerator apparatus 301 in accordance with an implementation. For example, accelerator 301 may be implemented as described with respect to accelerator 108 of FIG. 1, accelerator 201 of FIG. 2, and/or any other accelerator described herein. In some implementations, accelerator 301 may comprise accelerator logic 302, transaction controller 303, link select circuitry 304, and transaction timer circuitry 305, which may be implemented as described with respect to accelerator logic 202, transaction controller 203, link select circuitry 204, and transaction timer circuitry 205 of FIG. 2, respectively.

In some implementations, accelerator 301 may further comprise interface circuitry 309, 310 comprising a plurality of ports 311, 312, 313, 314, 315, 316, 317, 318. For example, interface circuitry 309 may comprise a first group of ports 311-314 as described with respect to port 209 and interface circuitry 310 may comprise a second group of ports 315-318 as described with respect to port 210 of FIG. 2. In various implementations, ports 311-318 may be connected to various edge ports of a memory-semantic fabric in any configuration. As an illustrative example, with respect to the system 100 of FIG. 1, ports 311-314 might comprise interface circuitry 113 connected to interface circuitry 117 of a first wing chiplet 106 and ports 315-518 might comprise interface circuitry 114 connected to interface circuitry 119 of a second wing chiplet 107. For ease of explanation, ports 311-315 are described as including a 3-bit port identifier, where a first bit indicate a port group and the second two bits indicate a port within the port group. In further implementations, accelerator 301 may comprise fewer ports or additional ports. For example, an implementation of accelerator 301 as described with respect to accelerator 108 of FIG. 1 might comprise four port groups corresponding to interfaces 113, 114, 115, 116.

In some implementations, accelerator 301 may further comprise port select cache 307. For example, port select cache 307 may be implemented as described with respect to port select 207 of FIG. 2 with the addition of tracked latencies within entries 308. In some implementations, port select cache entries 308 may associate virtual addresses with ports via port group indicators. For example, an entry may comprise an identifier for a port group (e.g., a 0 to indicate port group 309 and/or a 1 to indicate port group 210). In further implementations, port select cache entries 308 may include port and/or port group identifiers in combination. For example, port select cache entries 308 may include wildcard/"don't care" bits. For instance, port select cache 307 may comprise a ternary CAM (tCAM). Accordingly, in this example, an entry 308 comprising 0xx may indicate port group '0' 309, an entry 308 comprising port 1xx may indicate port group '1' 310, and an entry comprising 110 (or other 3 bit id) may indicate a particular port.

In some implementations, port select cache 307 may further store latencies associated with prior access to virtual memory addresses within a page. Accelerator 301 may further comprise cache controller circuitry 306 to evaluate a latency of a transaction according to a latency condition based, at least in part, on a stored latency in an existing entry. For example, the latency condition may be based on a comparison of a transaction latency to a stored latency. For instance, cache controller 306 might remove a port indicator if a transaction latency exceeds the stored latency by a threshold amount/degree.

For example, if accelerator logic 302 and/or transaction controller 303 conducts a memory transaction for a virtual address having a corresponding cache entry, cache controller 306 may compare a latency for the transaction received from transaction timer 305 to a latency stored in the corresponding cache entry 308. As an example, cache controller 306 may have a threshold latency for storing a port group indicator and a second threshold latency for storing a particular port indicator. For instance, cache controller 306 might store an indicator 1xx (e.g., for port group 310) if a transaction met a first threshold (e.g., a latency of 100 ns or less) and might store an indicator 110 (e.g., for port 317) if a transaction met a second transaction (e.g., a latency of 85 ns or less). Similarly, cache controller 306 may update an entry for a particular port indicator to a port group indicator (e.g., from 110 to 1xx) if a transaction exceeds a second threshold (e.g., exceeds 85 ns latency).

Figure 4A:
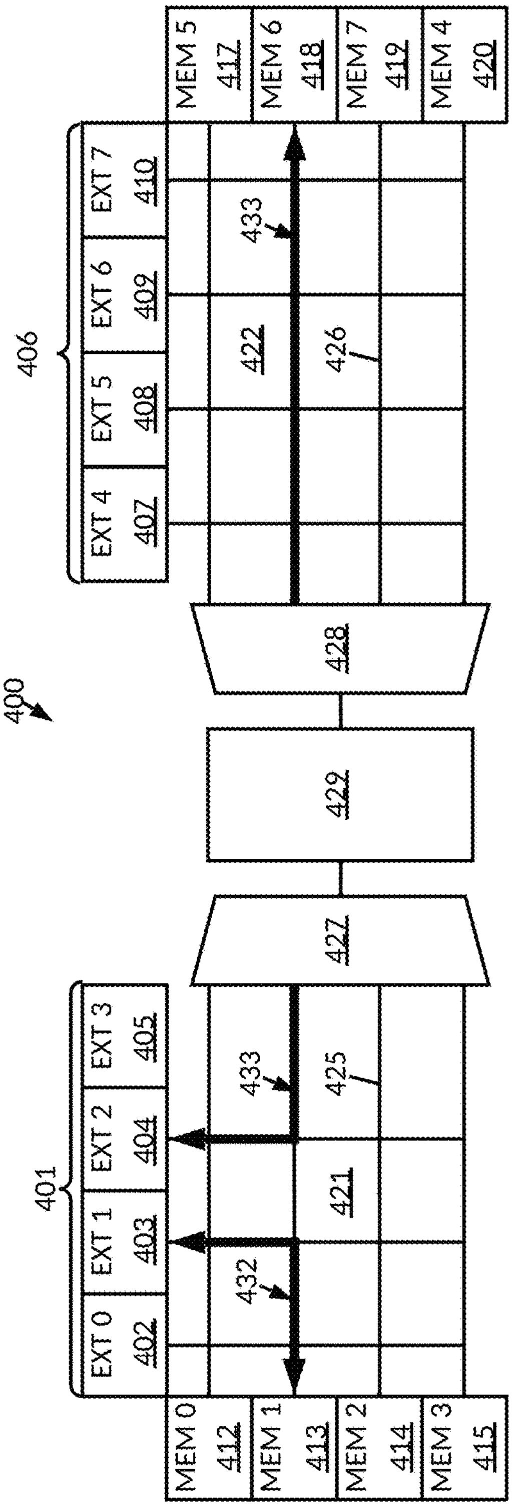
FIGS. 4A, 4B illustrate example traffic flows over a memory bridge 400 connected to an accelerator, in accordance with an implementation.
Figure 4B:
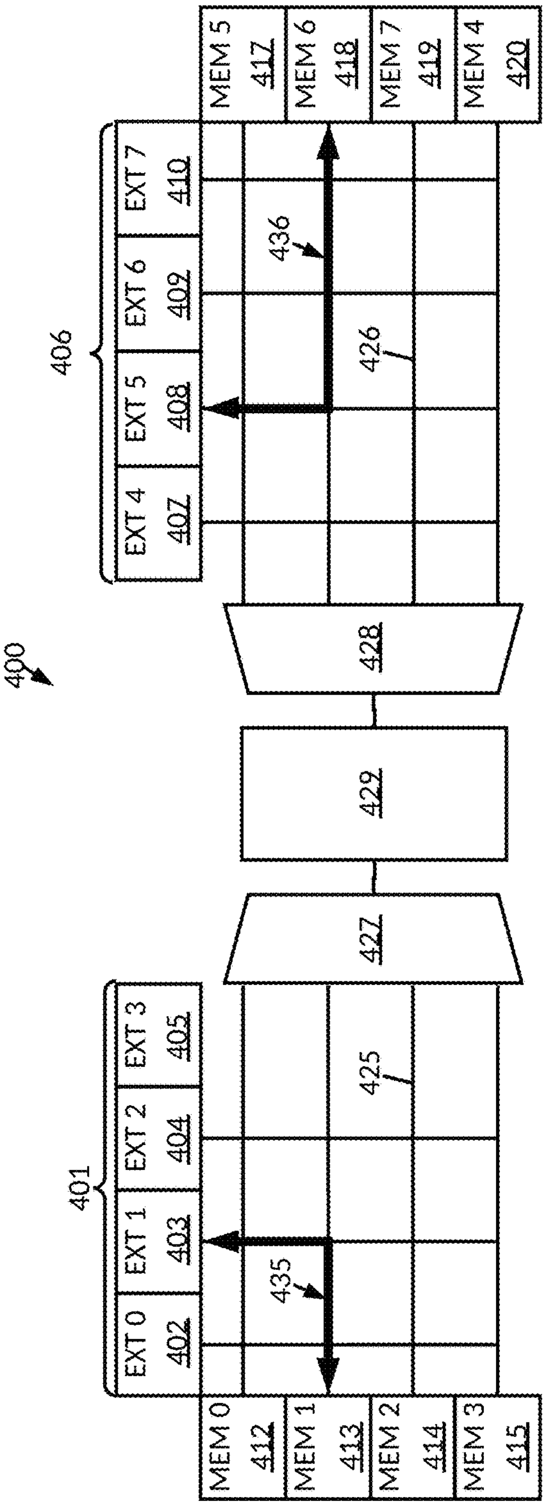

FIGS. 4A, 4B illustrate example traffic flows over a memory bridge 400 connected to an accelerator, in accordance with an implementation. For example, memory bridge 400 may comprise an implementation of memory bridge 101 of FIG. 1. As an example, memory bridge 400 may comprise a first wing chiplet 421, a central chiplet 429, and a second wing chiplet 422. For instance, first wing chiplet 421, central chiplet 429, and second wing chiplet 422 may be implemented as described with respect to wing chiplet 106, central chiplet 102, and wing chiplet 107 of FIG. 1.

In some implementations, first wing chiplet 421 may comprise interface circuitry 401 for a memory-semantic interconnect. For instance, interface circuitry 401 may comprise a plurality of ports 402, 403, 404, 405. Similarly, second wing chiplet 422 may comprise interface circuitry 406 for the memory-semantic interconnect, which may comprise a second plurality of ports 407, 408, 409, 410. In various implementations, interface circuitry 401, 406 may be connected to one or more accelerators. As an example, a first group of ports may be connected to a first accelerator and a second group of ports may be connected to a second accelerator. For instance, a first pair of ports 402, 403 of interface 401 and a first pair of ports 407, 408 of interface 406 might be connected to a first accelerator. In this example, a second pair of ports 404, 405 of interface 401 and a second pair of ports 409, 410 of interface 406 might be connected to a second accelerator. Accordingly, in this example, both accelerators may have balanced connections to both wing chiplets 421, 422. As another example, memory bridge 400 may be connected to a single accelerator. For instance, an accelerator such as accelerator 301 of FIG. 3 may comprise a corresponding plurality of ports connected to ports 402-405, 407-410. As an example with respect to accelerator 301, ports 311-314 of a first port group 309 may be connected to corresponding ports 402-405 of interface 401. In this example, ports 315-318 of a second port group 310 may be connected to corresponding ports 407-410.

In some implementations, first wing chiplet 421 may comprise interface circuitry 412, 413, 414, 415 for a memory interconnect, such as a plurality of media controllers to translate serial memory transactions received via the memory semantic network (e.g., CXL) to parallel communications to conduct the transactions on one or more connected memory modules (e.g., DDR5 commands). Similarly, second wing chiplet 422 may comprise interface circuitry 417, 418, 419, 420 for a memory interconnect. For instance, circuitry 417-420 may comprise instances of media controller circuitry similar to interface circuitry 412-415. Wing chiplets 421, 422 may further comprise on-chip networks 425, 426. As an example, on-chip networks 425, 426 may comprise a cross-bar topology, a star topology, tree topology, ring topology, and/or the like. In some implementations, memory bridge 400 may further comprise a central chiplet 429 and chiplet-to-chiplet interconnects 427, 428 connecting on-chip networks 421, 422.

As an example of aspects described above, lines 432, 433 of FIG. 4A illustrate example traffic for two memory transactions and lines 435, 436 of FIG. 4B illustrate example traffic for two subsequent memory transactions. For example, transactions 432, 435 may be transactions for memory addresses associated with a common port select cache entry 208/308 (e.g., transaction 432, 435 may be for same memory address, for memory addresses on the same page, or cache grouping). Similarly, transactions 433, 435 may corresponding to commonly cached memory addresses associated with a different port select cache entry 208/308. For instance, transactions 432, 435 might correspond to virtual addresses within a page range of 0 KB-4096 KB and transactions 433, 436 might correspond to virtual addresses within a page range of 4096 KB-8192 KB.

As illustrated, a connected accelerator selected port 403 for a first memory transaction based on a first virtual address, which may be issued as a memory transaction 432 associated with a physical memory address (e.g., via address translation services provided by the memory-semantic protocol). Here, memory bridge 400 may route memory transaction 432 from/to port 403 to/from port 413. Accordingly, transaction 432 may correspond to four network hops (e.g., two hops for a request and two hops for a response). In comparison, as illustrated, for transaction 433, the connected accelerator selected port 404 based on a virtual address. However, for transaction 433 the physical memory address corresponding to memory connected to port 418. Accordingly, transaction 433 may correspond to eight network hops (e.g., four for a request and four for a response). Thus, in this example, transaction 433 may incur a higher latency than transaction 432. Accordingly, as described with respect to FIGS. 2, 3, a port select cache may be updated to associate port 403 with the corresponding virtual address range for transaction 432. With respect to transaction 433, a port select cache may be updated to disassociate port 404 with the corresponding virtual address range (e.g., based on a high-latency threshold condition) so that port 404 is excluded from a subsequent port select operation. In some cases, the port group 402-405 of interface 401 may be excluded from selection. In further implementations, a port select cache may be updated to associate interface 406 with the corresponding virtual address range (e.g., via a process of elimination). In still further implementations, the virtual address range associate with transaction 433 may be left out of the port select cache, which may result in a different port selection in a subsequent transaction to the corresponding virtual address range.

Continuing with the illustrated example, an accelerator may use the cache entry resulting from transaction 432 to issue transaction 435 to the same memory page via port 403. In some implementations, physical memory addresses corresponding to a single virtual memory page may be co-located in the memory system. For example, physical addresses corresponding to a common virtual memory page may be located on a common memory channel, may be located on memory connected to a common wing chiplet 421, and/or may be located according to other like data co-locality arrangements. Accordingly, subsequent memory transaction 435 may be routed to the same memory interface 413 as transaction 432, resulting in a similarly low latency.

Continuing with the illustrated example, an accelerator may use a cache entry resulting from transaction 433 to select a port 408 outside of port group 401. Alternatively, the accelerator may randomly select another port 408 for transaction 426 (e.g., if transaction 433 did not trigger a port select cache entry). Here, subsequent memory transaction 436 may undergo four network hops similarly to transactions 432, 435, resulting in a link select cache entry associating port 408 with the corresponding memory range. Accordingly, future memory accesses to these memory address ranges may be conducted over port 408, resulting in similar low latencies. Further, as this example illustrates, aspects of the disclosed technology may reduce traffic over bottlenecks such as chiplet-to-chiplet interconnects 427, 428, avoiding corresponding congestion which may occur from traffic traversing chiplet 429.

Figure 5:
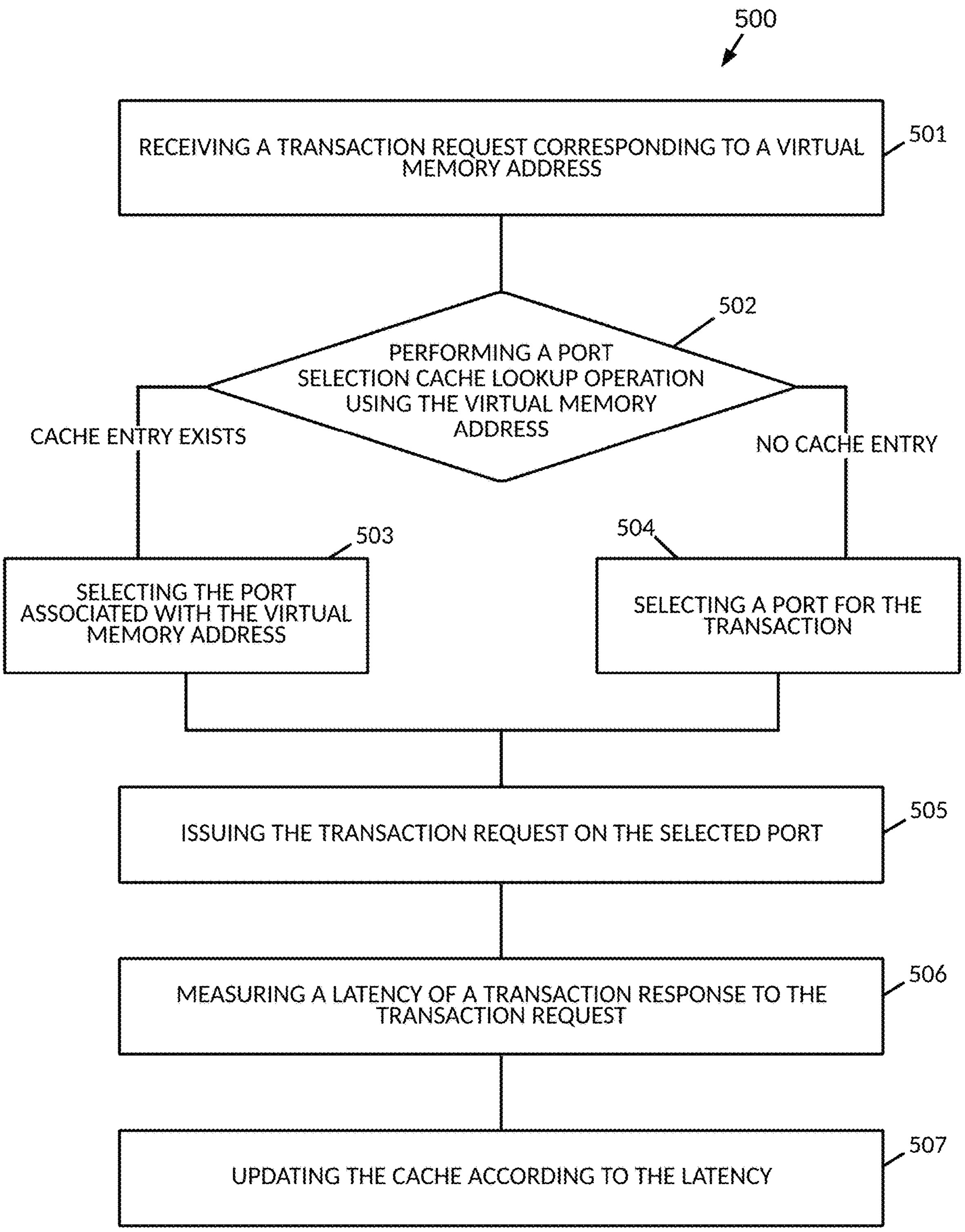
FIG. 5 illustrates an example method of operation, in accordance with an implementation.

FIG. 5 illustrates a method 500 of operation, such as of devices implemented as described with respect to FIGS. 1-4. For example, method 500 may be performed by an accelerator to select a port to conduct a memory transaction.

In some implementations, method 500 may comprise operation 501, which may include receiving a transaction request corresponding to a virtual memory address. For example, operation 501 may comprise receiving a transaction request issued by an accelerator. For instance, operation 501 may comprise a communication interface, transaction controller, protocol logical device (e.g., a head device, root complex, and/or the like), or other accelerator component receiving a transaction issued by an accelerator logic. For example, the hardware logic may be as described with respect to accelerator logic 202 of FIG. 2. For instance, operation 501 may comprise receiving a memory load request for a cacheline addressed by a virtual memory address.

In some implementations, method 500 may comprise operation 502, which may include performing a port selection cache lookup based, at least in part, on the virtual memory address received in operation 501. For example, as described with respect to FIGS. 2 and 3, operation 502 may comprise port select circuitry 204, 304 of a transaction controller 203,303 performing a cache lookup on a port select cache 207, 307. For example, operation 501 may comprise performing a CAM lookup on a cache using a page-address portion of the virtual memory address to determine if a cache entry exists for the virtual memory address.

In some implementations, method 500 may comprise operation 503, which may include selecting a port for the transaction based on an entry stored in a cache entry and associated with the virtual memory address. Operation 503 may be performed in response to determining that a cache entry exists in operation 502. For example, operation 503 may occur if a prior performance of method 500 created a cache entry for the virtual memory address. For instance, operation 503 may be performed as described with the operation of an accelerator 201, 301, such as with respect to transaction 435 following transaction 432.

In some implementations, method 500 may comprise operation 504, which may comprise selecting a port for the transaction if there is no existing cache entry for the virtual memory address. For example, operation 504 may comprise performing a load balancing operation or like port selection technique to select a port, such as described with respect to operation of link select circuitry 204 of FIG. 2.

In some implementations, method 500 may comprise operation 505, which may include issuing the transaction request on the port selected in operation 503 or 504. For example, operation 505 may comprise performing a virtual-to-physical memory address translation operation, such as via an address translation service provided by a memory-semantic interconnect protocol. In some implementations, operation 505 may further comprise generating a transaction request message, such as by formatting the transaction request received in operation 501. For example, message generation may be performed by a port, a transaction controller, and/or other communication interface circuitry as described with respect to FIGS. 2-4. Operation 505 may further comprise issuing the transaction by transmitting the transaction request via the selected port.

In some implementations, method 500 may further comprise operation 506, which may include measuring, in one implementation, a latency of the transaction. For example, operation 506 may comprise measuring a latency for a transaction response to the transaction request issued in operation 505. For instance, operation 506 may be performed as described with respect to transaction timer circuitry 205, 303 of FIGS. 2, 3. For instance, operation 506 may comprise maintaining a timers for outstanding transaction requests in a data storage circuitry, such as a static random access memory (SRAM), register set, and/or the like. It should be understood, however, that measurement of a latency at operation 506 is merely one example of a performance parameter that may be measured. In another implementation, for example, operation 506 may measure any one of several different performance parameters such as available bandwidth, data throughput, number of outstanding requests, just to provide a few examples of performance parameters that may be measured by operation 506 in lieu of or in addition to transaction latency. In one particular implementation, operation 506 may measure multiple performance parameters.

In some implementations, method 500 may further comprise operation 507, which may comprise updating the port selection cache according to the one or more performance parameters measured in operation 506. For example, operation 506 may be performed as described with respect to operation of cache controller circuitry 206, 306 of FIGS. 2, 3. In some implementations, operation 507 may comprise comparing one or more measured performance parameters (e.g., latency) to a performance (e.g., latency) condition, such as a performance threshold. For instance, the performance condition may be based, at least in part, on an average of one or more performance parameters, one or more programmed performance parameters, one or more performance parameters for the virtual memory address stored in the port select cache, or other condition. Operation 507 may include adding an entry to the port selection cache if one or more measured performance parameters meet the performance condition. For example, the cache entry may associate a group of virtual memory address, such as a memory page, that contains the virtual memory address with the selected port.

In further implementations, operation 507 may comprise disassociating the memory address from the port based on one or more measured performance parameters failing the latency condition (or meeting a disassociation performance condition). For instance, operation 507 removing an entry from a cache as described with respect to the operation of cache controller circuitry 206, 306 of FIGS. 2, 3.

Figure 6:
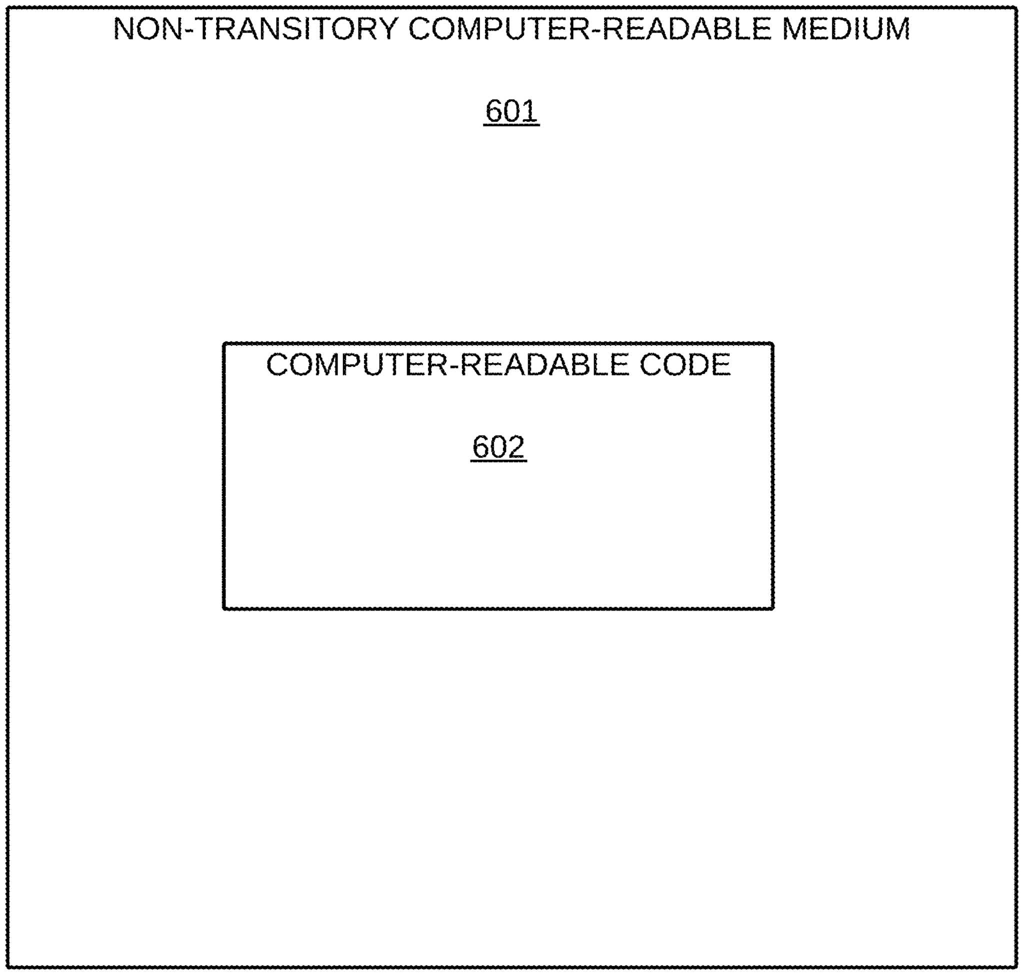
FIG. 6 illustrates an example non-transitory computer-readable medium containing code for fabricating an apparatus, in accordance with an implementation.

FIG. 6 illustrates an example of a non-transitory computer-readable medium 601 comprising computer-readable code 602. Concepts described herein may be embodied in computer-readable code 602 for fabrication of an apparatus that embodies the described concepts. For example, the computer-readable code 602 can be used at one or more stages of a semiconductor design and fabrication process, including an electronic design automation (EDA) stage, to fabricate an integrated circuit comprising the apparatus embodying the concepts. The above computer-readable code 602 may additionally or alternatively enable the definition, modeling, simulation, verification and/or testing of an apparatus embodying the concepts described herein.

For example, the computer-readable code 602 for fabrication of an apparatus embodying the concepts described herein can be embodied in code 602 defining a hardware description language (HDL) representation of the concepts. For example, the code 602 may define a register-transfer-level (RTL) abstraction of one or more logic circuits for defining an apparatus embodying the concepts. The code 602 may define an HDL representation of the one or more logic circuits embodying the apparatus in Verilog, SystemVerilog, Chisel, or VHDL (Very High Speed Integrated Circuit Hardware Description Language) as well as intermediate representations such as FIRRTL. Computer-readable code 602 may provide definitions embodying the concept using system-level modeling languages such as SystemC and SystemVerilog or other behavioral representations of the concepts that can be interpreted by a computer to enable simulation, functional and/or formal verification, and testing of the concepts.

Additionally or alternatively, the computer-readable code 602 may define a low level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 602 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code 602 may comprise a mix of code 602 representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code 602 defining instructions which are to be executed by the defined apparatus once fabricated.

Such computer-readable code 602 can be disposed in any known transitory computer-readable medium (such as wired or wireless transmission of code over a network) or non-transitory computer-readable medium 601 such as semiconductor, magnetic disk, or optical disc. An integrated circuit fabricated using the computer-readable code 602 may comprise components such as one or more of a central processing unit, graphics processing unit, neural processing unit, digital signal processor or other components that individually or collectively embody the concept.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

Some configurations of the present techniques are described by the following numbered clauses:

Clause 1: An apparatus, comprising:

memory-semantic interface circuitry comprising a plurality of ports;

port select circuitry to select a first port of the plurality of ports to transmit a first transaction request associated with a virtual memory address;

request circuitry to issue the first transaction request via the first port;

tracking circuitry to measure one or more performance parameters of a response to the transaction request;

a cache to associate the plurality of ports to virtual memory addresses; and cache control circuitry to update the cache to associate the first port with the virtual memory address responsive to the one or more performance parameters meeting a threshold performance condition.

Clause 2: The apparatus of clause 1, wherein the cache control circuitry is to update the cache to associate a second port with the virtual memory address responsive to the one or more performance parameters failing the threshold performance condition.

Clause 3: The apparatus of any preceding clause, wherein the cache control circuitry is to update the cache to disassociate the first port with the virtual memory address responsive to the one or more performance parameters failing the threshold performance condition.

Clause 4: The apparatus of any preceding clause, wherein the cache control circuitry is to update the cache to associate the first port with a group of virtual memory addresses that include the virtual memory address.

Clause 5: The apparatus of any preceding clause, wherein the group of virtual memory addresses comprises a virtual memory address page.

Clause 6: The apparatus of any preceding clause, wherein the port select circuitry is select the first port responsive to a cache entry associating a group of virtual memory addresses including the virtual memory address to the first port.

Clause 7: The apparatus of any preceding clause, wherein:

the first port is closer to a first portion of a physical memory address space than a second portion of the physical memory address space; and a second port of the plurality is closer to the second portion than the first portion.

Clause 8: The apparatus of any preceding clause, wherein the cache control circuitry is to update the cache to store the one or more performance parameters associated with the virtual memory address.

Clause 9: The apparatus of any preceding clause, wherein the threshold performance condition comprises a comparison of one or more prior performance parameters associated with the virtual memory address and stored in the cache.

Clause 10: A method, comprising:

receiving a transaction request corresponding to a virtual memory address;

selecting a first port of a plurality of ports of memory-semantic interface circuitry;

issuing the transaction request on the selected port;

measuring one or more performance parameters of a transaction response to the transaction request; and associating the virtual memory address to the first port responsive to the one or more performance parameters meeting a threshold performance condition.

Clause 11: The method of clause 10, wherein associating the virtual memory address to the first port comprises associating the first port to a virtual memory address page comprising the virtual memory address.

Clause 12: The method of any of clauses 10-11, wherein selecting the first port comprises performing a cache lookup based, at least in part, on the virtual memory address.

Clause 13: The method of any of clauses 10-12, further comprising selecting the first port responsive to a cache entry associating a group of virtual memory addresses including the virtual memory address to the first port Clause 14: The method of any of clauses 10-13, further comprising: disassociating the first port with the virtual memory address responsive to the one or more performance parameters failing the threshold performance condition.

Clause 15: The method of any of clauses 10-14, further comprising associating a second port with the virtual memory address responsive to the one or more performance parameters failing the threshold performance condition.

Clause 16: The method of any of clauses 10-15, further comprising storing the one or more performance parameters associated with the virtual memory address and the first port.

Clause 17: A non-transitory computer-readable medium storing computer-readable code for fabrication of a device comprising:

memory-semantic interface circuitry comprising a plurality of ports;

port select circuitry to select a first port of the plurality of ports to transmit a first transaction request associated with a virtual memory address;

request circuitry to issue the first transaction request via the first port;

tracking circuitry to measure one or more performance parameters of a response to the transaction request;

a cache to associate the plurality of ports to virtual memory addresses; and cache control circuitry to update the cache to associate the first port with the virtual memory address responsive to the one or more performance parameters meeting a threshold performance condition.

Clause 18: The non-transitory computer-readable medium of clause 17, wherein the cache control circuitry is to update the cache to disassociate the first port with the virtual memory address responsive to the one or more performance parameters failing the threshold performance condition.

Clause 19: The non-transitory computer-readable medium of any of clauses 17-18, wherein the cache control circuitry is to update the cache to store the latency associated with the virtual memory address.

Clause 20: The non-transitory computer-readable medium of any of clauses 17-19, wherein the threshold performance condition comprises a comparison of the one or more performance parameters to one or more prior measured performance parameters associated with the virtual memory address and stored in the cache.

What is claimed is:

1. An apparatus, comprising:

memory-semantic interface circuitry comprising a plurality of ports;

request circuitry to issue a first transaction request on a first port of the plurality of ports selected to transmit the first transaction request;

a cache to associate the plurality of ports to virtual memory addresses; and cache control circuitry to update the cache to include an entry associating the first port with a first virtual memory address responsive to one or more measured performance parameters of a response to the first transaction request meeting a threshold performance condition.

2. The apparatus of claim 1, wherein the cache control circuitry is to update the cache to include an entry associating a second port with the first virtual memory address responsive to the one or more measured performance parameters failing the threshold performance condition.

3. The apparatus of claim 1, wherein the cache control circuitry is to update the cache to disassociate the first port with the first virtual memory address responsive to the one or more measured performance parameters failing the threshold performance condition.

4. The apparatus of claim 1, wherein the cache control circuitry is to update the cache to include an entry associating the first port with a group of virtual memory addresses that include the first virtual memory address.

5. The apparatus of claim 4, wherein the group of virtual memory addresses comprises a virtual memory address page.

6. The apparatus of claim 1, wherein the first port is selected responsive to a cache entry associating a group of virtual memory addresses including the first virtual memory address to the first port.

7. The apparatus of claim 1, wherein:

the first port is closer to a first portion of a physical memory address space than a second portion of the physical memory address space; and a second port of the plurality is closer to the second portion than the first portion.

8. The apparatus of claim 1, wherein the cache control circuitry is to update the cache to store the one or more measured performance parameters associated with the first virtual memory address.

9. The apparatus of claim 8, wherein the threshold performance condition comprises a comparison of the one or more measured performance parameters to at least one prior performance parameter associated with the first virtual memory address and stored in the cache.

10. A method, comprising:

receiving a transaction request corresponding to a virtual memory address;

issuing the transaction request on a first port of a plurality of memory-semantic interface circuitry selected from a port select cache;

and updating the port select cache to include an entry associating a first virtual memory address to the first port responsive to one or more performance parameters of a response to first transaction request meeting a threshold performance condition.

11. The method of claim 10, wherein associating the virtual memory address to the first port comprises updating the port select cache to associate the first port to a virtual memory address page comprising the virtual memory address.

12. The method of claim 10, wherein selecting the first port comprises performing a cache lookup based, at least in part, on the virtual memory address.

13. The method of claim 12, further comprising selecting the first port responsive to a cache entry associating a group of virtual memory addresses including the first virtual memory address to the first port.

14. The method of claim 10, further comprising:

disassociating the first port with the virtual memory address responsive to the one or more performance parameters failing the threshold performance condition.

15. The method of claim 10, further comprising associating a second port with the virtual memory address responsive to the one or more performance parameters failing the threshold performance condition.

16. The method of claim 10, further comprising storing the one or more performance parameters associated with the virtual memory address and the first port.

17. A non-transitory computer-readable medium storing computer-readable code for fabrication of a device comprising:

memory-semantic interface circuitry comprising a plurality of ports;

request circuitry to issue a first transaction request on a first port of the plurality of ports selected to transmit the first transaction request;

a cache to associate the plurality of ports to virtual memory addresses; and cache control circuitry to update the cache to include an entry associating the first port with a first virtual memory address responsive to one or more measured performance parameters of a response to the first transaction request meeting a threshold performance condition.

18. The non-transitory computer-readable medium of claim 17, wherein the cache control circuitry is to update the cache to disassociate the first port from the first virtual memory address responsive to the one or more measured performance parameters failing the threshold performance condition.

19. The non-transitory computer-readable medium of claim 17, wherein the cache control circuitry is to update the cache to store the one or more measured performance parameters associated with the first virtual memory address.

20. The non-transitory computer-readable medium of claim 19, wherein the threshold performance condition comprises a comparison of at least one of the one or more measured performance parameters to one or more prior performance parameters associated with the first virtual memory address and stored in the cache.

* * * * *